US007279193B2

(12) United States Patent
Oishi et al.

(10) Patent No.: US 7,279,193 B2
(45) Date of Patent: *Oct. 9, 2007

(54) BEVERAGES CONTAINING CATECHINS

(75) Inventors: Susumu Oishi, Tokyo (JP); Koichi Naito, Tokyo (JP); Yuji Matsui, Tochigi (JP); Yoshikazu Ogura, Tokyo (JP)

(73) Assignee: Kao Corporation, Tokyo (JP)

( * ) Notice: Subject to any disclaimer, the term of this patent is extended or adjusted under 35 U.S.C. 154(b) by 603 days.

This patent is subject to a terminal disclaimer.

(21) Appl. No.: 10/468,573

(22) PCT Filed: Feb. 20, 2002

(86) PCT No.: PCT/JP02/01465

§ 371 (c)(1),
(2), (4) Date: Aug. 21, 2003

(87) PCT Pub. No.: WO02/065846

PCT Pub. Date: Aug. 29, 2002

(65) Prior Publication Data

US 2004/0065207 A1    Apr. 8, 2004

(30) Foreign Application Priority Data

Feb. 22, 2001    (JP)    ............. 2001-047282

(51) Int. Cl.
*A23F 3/00*    (2006.01)
(52) U.S. Cl. .............. 426/597; 426/106; 426/590
(58) Field of Classification Search .......... 426/597, 426/106, 590
See application file for complete search history.

(56) References Cited

U.S. PATENT DOCUMENTS

| 4,680,193 A | 7/1987 | Lunder et al. |
| 5,063,428 A | 11/1991 | Mohlenkamp, Jr. et al. |
| 5,780,086 A | 7/1998 | Pultinas, Jr. |

FOREIGN PATENT DOCUMENTS

| EP | 0 416 667 | 3/1991 |
| EP | 0 426 230 | 5/1991 |
| JP | 06 343389 | 12/1994 |
| JP | 2000 060427 | 2/2000 |
| WO | 02 39822 | 5/2002 |

OTHER PUBLICATIONS

Explanation of Circumstances Concerning Accelerated Examination : 2001-047282.
Notice of Opposition to the Grant of Patent : Opposition No. 2003-71621 No. 1 published 2003.
Notice of Opposition of the Grant of Patent: Opposition No. 2003-71621 No. 2 published 2003.
Notice of Opposition to the Grant of Patent; Notice of Opposition(ITO EN, LTD.); Opposition No. 2003-71208; Patent No. 3342698, May 12, 2003 English translation provided.
Notice of Opposition to the Grant of Patent; Notice of Opposition(ITO EN, LTD.); Opposition No. 2003-70843; Patent No. 3329799; Mar. 31, 2003 English translation provided.
Notice of Opposition to the Grant of Patent; Notice of Opposition(Kiichiro Yoshikawa); Opposition No. 2003-72082(01); Patent No. 3378577; Aug. 13, 2003 English translation provided.
Notice of Opposition to the Grant of Patent; Notice of Opposition(ITO EN, LTD.); OPposition No. 2003-72082(02); Patent No. 3378577; Aug. 18, 2003 English translation provided.
Li-Fei Wang et al.: "Effects of heat processing and storage on flavanols and sensory qualities of green tea beverage" J. Agric. Food Chem., vol. 48, pp. 4227-4232 2000.
U.S. Appl. No. 10/145,733, filed May 16, 2002, Inaoka, et al.
U.S. Appl. No. 10/256,081, filed Sep. 27, 2002, Iwasaki, et al.
U.S. Appl. No. 10/259,770, filed Sep. 30, 2002, Ohishi, et al.
U.S. Appl. No. 10/416,924, filed May 16, 2003, Inaoka, et al.
U.S. Appl. No. 10/468,573, filed Aug. 21, 2003, Oishi, et al.

*Primary Examiner*—Anthony Weier
(74) *Attorney, Agent, or Firm*—Oblon, Spivak, McClelland, Maier & Neustadt, P.C.

(57) ABSTRACT

Provided is a beverage e.g. tea, containing a high concentration of catechins and at the same time having an improved taste with alleviated bitterness and astringency and smooth throat-feel upon drinking. The beverage has the following non-polymer component (A), another non-polymer component (B), and component (C): (A) non-epi-catechins, (B) epi-catechins, (C) water-soluble polymers; and has, per 500 mL of the beverage, these components in amounts satisfying the following equations: (i) (A)+(B)=300 to 2500 mg; (ii) (A)=70 to 2250 mg; (iii) (A)/(B) (by weight)=0.25 to 9.0; and (iv) (C)/((A)+(B)) (by weight)=1/20 to 10/1.

20 Claims, No Drawings

BEVERAGES CONTAINING CATECHINS

TECHNICAL FIELD

The present invention relates to beverages containing a high concentration of catechins but having improved taste with reduced bitterness and astringency.

BACKGROUND ART

It is reported that catechins have effects, for example, as an inhibitor against a rise in cholesterol level (Japanese Patent Application Laid-Open (kokai) No. Sho 60156614), for reduction of a plasma cholesterol level (Japanese Patent Application Laid-Open (kokai) No. Hei 6-80580) or as an α-amylase activity inhibitor (Japanese Patent Application Laid-Open (kokai) No. Hei 3-133928). This suggests that tea beverages such as green tea, black tea and Oolong tea have physiological effects.

In order to gain such physiological effects of catechins, an adult must take four to five cups of tea a day (The Food Industry, 35(14), 26-30(1992)). There has accordingly been a demand for the development of a technique of mixing a high concentration of catechins in a beverage. Tea beverages containing a high concentration of catechins (Japanese Language Laid-Open Publication (PCT) No. Hei 11-504224, Japanese Patent Application Laid-Open (kokai) No. 2000-60427) have however strong bitterness and astringency due to catechins, caffeine and tannin extracted from tea (tea leaves) so that they are not preferred as a beverage.

As a conventional evaluation method of bitterness, known is a method using quinine sulfate. According to an index as specified by the bitterness evaluating method by using sulfate quinine (Equivalency Concentration Testing Method/Organoleptic Test Handbook, ed. by Organoleptic Test Committee/JUSE, published by JUSE Press, Ltd.), beverages having an index of 5 or greater are not suited for drinking owing to intense bitterness. With regards to beverages having various catechin concentrations, an index of those having a catechin concentration of 300 mg/500 mL exceeds 6, while those having a catechin concentration of 900 mg/500 mL exhibits an index of 10 or greater and in addition, has pungency.

A beverage increased in its catechin content to impart it with physiological usefulness has accordingly strong bitterness and astringency and is not suited for daily drinking.

As an agent for reducing this bitterness and astringency peculiar to catechins, proposed are a cyclodextrin (Japanese Patent Application Laid-Open (kokai) No. Hei 10-4919) and a bitterness reducing agent comprising a natural polymer (Japanese Patent Application Laid-Open (kokai) No. Hei 3-164136, Japanese Journal of Taste and Smell Research, 6(3), 665-668, 1999). The physiological action of catechins can be exhibited effectively by increasing their intake amount. Beverages containing much catechins are inferior in taste, but forms facilitating high intake of catechins is desired from marketability.

As a method for incorporating a large amount of catechins in a beverage, proposed is a method of adding powdered tea leaves (Japanese Patent Application Laid-Open (kokai) No. Hei 10-234301). In this method, however, when powdered leaves are added at a high concentration, excessive existence of powders in the beverage disturbs smooth throat-feel and leaves an uncomfortable taste in the mouth. In addition, such a beverage provided after a distribution process have precipitates of powdered tea leaves on the bottom of its container or their floats on the surface of the beverage upon drinking. Such precipitates in a transparent container, for example, PET bottle greatly damages its appearance and hence commodity value. Moreover, in a beverage providing physiological effects, consumers must shake or stir it upon drinking to disperse the powdered tea leaves uniformly.

A method of adding catechins in the dissolved form by making use of a catechin preparation is proposed (Japanese Patent Application Laid-Open (kokai) No. Hei 2-182176, Japanese Language Laid-Open (PCT) No. Hei 8-504591). The dissolved catechins have bitterness and astringency. A beverage containing a large amount of them has therefore intense bitterness and astringency and drinking of such a beverage is rather a pain. Accordingly, daily or continuous drinking until its physiological effects appear is impossible.

An object of the present invention is therefore to provide a beverage containing a high concentration of catechins but having improved taste with reduced bitterness and astringency.

DISCLOSURE OF THE INVENTION

The present inventor has found that when a watersoluble polymer is added to a highly concentrated catechins beverage containing both of non-epi-catechins and epicatechins of non-polymerized type at a specific ratio, it is possible to obtain a beverage having a higher quality which is no longer affected by bitterness and astringency.

In the present invention, there is thus provided a beverage, which comprises in the dissolved form the following non-condensed component (A), another non-condensed component (B), and component (C):

(A) non-epi-catechins,
(B) epi-catechins,
(C) water-soluble polymers; and has, per 500 mL of the beverage, these components in amounts satisfying the following equations:

$$(A)+(B)=300 \text{ to } 2500 \text{ mg} \tag{i}$$

$$(A)=70 \text{ to } 2250 \text{ mg} \tag{ii}$$

$$(A)/(B)(\text{by weight})=0.25 \text{ to } 9.0, \text{ and} \tag{iii}$$

$$(C)/((A)+(B))(\text{by weight})=1/20 \text{ to } 10/1 \tag{iv}$$

BEST MODE FOR CARRYING OUT THE INVENTION

The term "catechins" as used herein means a generic name of non-epi-catechins such as catechin, gallocatechin, catechin gallate and gallocatechin gallate and epi-catechins such as epicatechin, epigallocatechin, epicatechin gallate and epigallocatechin gallate.

The catechins to be used in the present invention are available from a water extract or a hot water extract, to which an extracting assistant may be added as needed, of green teas such as natural leaf tea, coarse green tea, refined green tea, Tencha (green tea not powdered) and kiln-dried tea; semi-fermented teas which are generically called "oolong tea", such as Ti guan yin, Sezhong, Huang jin gui and Wu yi yan cha; and fermented teas called black teas such as Darjeeling, Assam and Ceylon; each made from tea leaves available from species belonging to *Camellia spp.* such as *C. sinensis* and *C. assamica* or the Yabukita variety, or hybrid thereof.

Tea is extracted by the conventional method such as extraction under stirring. Upon extraction, an organic acid or organic acid salt such as sodium ascorbate may be added to water in advance. A method of extracting in a socalled non-oxidizing atmosphere while removing dissolved oxygen by boiling deaeration or by feeding of an inert gas such as nitrogen gas may be used in combination. Instead of extraction from tea leaves, a tea extract concentrate may be dissolved in water or diluted with water, or a liquid extract from tea leaves and a tea extract concentrate may be added together.

The term "tea extract concentrate" as used herein means the concentrate of an extract obtained by extracting tea leaves with hot water or a water soluble organic solvent. It is prepared, for example, by a method as described specifically in Japanese Patent Application Laid-Open (kokai) No. Sho 59-219384, Hei 4-20589, Hei 5-260907 or Hei 5306279. Commercially available products of it include "Polyphenon" of Tokyo Food Techno, "Thea-furan" of Itoen, Ltd., "Sunphenon" of Taiyo Kagaku Co., Ltd. and "Sunoolong" of Suntory Limited. As catechins, those available from the other raw materials, column-purified products and chemically synthesized products can also be used. The "tea extract concentrate" in the present invention may be in various forms such as solid, aqueous solution and slurry. Examples of the medium (which will hereinafter be called "liquid extract") in which a tea extract concentrate is dissolved or with which it is diluted include water, carbonated water and common tea extracts.

Since the content of condensed polyphenol increases with the advance of the fermentation condition of tea leaves, the concentrate of a green tea extract is particularly preferred among the concentrates of various tea extracts to be added to water or a tea liquid extract.

In particular, combined use of a semi-fermented tea such as oolong tea and a fermented tea such as black tea is preferred, because catechins-related bitterness and astringency of the resulting beverage are alleviated further and its platability is excellent even if catechins concentration is heightened.

The beverage of the present invention has catechins content, that is, a total amount of Components (A) and (B) which are non-condensed and are dissolved in water is 300 to 2500 mg, preferably 400 to 1300 mg, more preferably 500 to 1300 mg, especially 500 to 800 mg per 500 mL of the beverage. Amounts within this range facilitate a high intake of catechins and, when a water-soluble polymer is used in combination, facilitate exhibition of bitterness and astringency reducing effects.

In the beverage, the catechins content in the total polyphenols is 10 wt. % or greater, preferably 20 wt. % or greater, rightly after preparation.

The content sum of epigallocatechin gallate, gallocatechin gallate, epigallo catechin is 30 to 98 wt. %, preferably 40 to 90 wt. %, in the total catechins. When catechins are selected from epigallocatechin gallate, gallocatechin gallate, epigallocatechin and gallocatechin, the resulting beverage has excellent taste and is preferred. Here, at least one of epigallocatechin gallate, gallocatechin gallate, epigallocatechin and gallocatechin is incorporated in the beverage, but usually all of them are incorporated.

In tea leaves, most of catechins exist as epi-catechins, but they change into their steric isomers, non-epi-catechins, by the treatment under heat or with an acid or alkali.

A drastic lowering in melting point is recognized from non-epi-catechins compared with epi-catechins, even if they have the same compositional formula. In some compositions, a further lowering in melting point happens to occur, depending on a mixing ratio of epi-catechins and non-epi-catechins. However, a functional difference between them has hardly been studied yet.

Non-epi-catechins are available by heating an aqueous solution of one of green tea, semi-fermented tea or fermented tea or an aqueous solution of the concentrate of a tea extract at 40 to 140° C. for 0.1 min to 120 hours.

Alternatively, the concentrate of a tea extract having a high non-epi-catechin content may be used. They may be used either singly or in combination.

It is preferred that Component (A) is incorporated in an amount of 70 to 2250 mg, preferably 140 to 2250 mg, especially 140 to 1880 mg, per 500 mL of the beverage. Amounts within this range accelerate the effects of a water-soluble polymer for reducing bitterness and astringency.

The Component (A)/Component (B) weight ratio is 0.25 to 9.0, preferably 0.43 to 9.0, more preferably 0.43 to 5.67, especially 0.54 to 5.67. Weights ratios falling within this range accelerate the taste improving effects brought by the addition of a water-soluble polymer.

As the water-soluble polymers serving as Component (C) in the present invention, any of the water-soluble polymers usable as food additives can be employed. Examples include gum arabic, alginic acid, carrageenan, agar, xanthan gum, gelatin, tamarind seed polysaccharide, furcellaran, locust bean gum, branched dextrin, polydextrose and caboxymethyl cellulose, with preferred examples being gelatin, branched dextrin, polydextrose and carboxymethyl cellulose (CMC). From the viewpoint of smooth throat-feel upon drinking, polydextrose and carboxymethyl cellulose are particularly preferred.

Water soluble polymers contained in natural products are also usable.

Water-soluble-polymer-containing natural products usable in the present invention include fruits such as blueberry and mandarin orange, vegetables such as dried gourd shavings, Japanese radish, burdock, jew's mallow, Brussels sprouts, spinach, corn and soybean sprouts, cereals such as wheat and rice, beans such as red bean, soybean and pea, seaweed such as dried kelp, brown algae and brown seaweed, mushrooms such as Shiitake, Enokidake, Maitake, Matsutake and eringii, and teas such as refined green tea, natural tea leaves, oolong tea and black tea. From the viewpoint of smooth throat-feel upon drinking, fruits, vegetables and teas are particularly preferred, with the teas being most preferred.

When the above-exemplified natural product is used, the water-soluble polymer in a beverage is quantitatively determined, for example, by isolating it from the beverage by solvent fractionation and reprecipitation, by treating the beverage with a specific enzyme and then conducting the similar operation, by GPC, by hydrolyzing the beverage and then subjecting the hydrolysate to gas chromatography, by separating the other components from the beverage by thin-layer chromatography and causing color development of the remaining polymer component by using a reagent, or by near infrared spectroscopy after conversion into a dried product.

Upon incorporation, the water-soluble polymer may be not only in the powder form but also in the solution or suspension form.

The weight ratio of the water-soluble polymer content (C) to the catechin content (A)+(B), that is, a quotient obtained by dividing the water-soluble polymer content by the catechins content ((C)/(A)+(B)) is 0.05 to 10, preferably 0.05 to 5, more preferably 0.08 to 2. At a weight ratio within the above-described range, a beverage has smooth throatfeel upon drinking and effects for alleviating the astringency of the beverage are sufficient.

The mechanism of action of the water-soluble polymer has not yet been revealed, but it is presumed that it suppresses adsorption of catechins to the bitterness receptor portion of the taste bud cell on the tongue or it adsorbs to the taste bud cell itself. It is presumed that the water-soluble polymer forms a weak association with catechins via a hydrogen bond or the like, thereby suppressing the contact of catechins to the bitterness receptor portion.

The pH of the beverage at 25° C. is preferably adjusted to 3 to 7, more preferably 4 to 7, especially 5 to 7 from the viewpoints of taste and chemical stability of catechins.

The beverage of the present invention preferably has a haze of 40 or less, more preferably 20 to 0.1, especially 15 to 0.3 in consideration of the commodity value in appearance and material quality of the container wherein the haze is measured by using a commercially available haze measuring apparatus at 25° C. In addition, a trouble of uniformly mixing the components upon drinking can be saved within such a haze.

The beverage happens to be turbid owing to the tea leaf powder added thereto or mutual action between the beverage component with catechins or polyphenol oxide produced by oxidation of catechins. Even without addition of tea leaf powder, mild filtering conditions upon preparation of a tea liquid extract from tea leaves permit fine leaf powder to be mixed in the beverage, resulting in turbidity.

The beverage of the present invention can be put on the market as is or a variety of catechins-containing beverages can be provided by mixing it with another beverage component such as juice as well as tea such as green tea, black tea or oolong tea. For example, the beverage can be added as needed to soft drinks such as carbonated beverages, juice-extract-containing beverages, vegetable-extract-containing juices, near-water drinks, sports beverages and diet drinks.

To the beverage of the present invention, additives not adversely affecting the tea-derived component can be added. Examples of such an additive include antioxidants, perfumes, organic acids, organic acid salts, inorganic acids, inorganic acid salts, inorganic salts, colorants, emulsions, preservatives, seasonings, sweeteners, acidifiers, juice extracts, vegetable extracts, nectar extracts, pH regulators and quality stabilizers. They may be used either singly or in combination. Their content may be 0.01 to 0.15% by weight.

As a container for packing the beverage, ordinarily employed ones such as molded containers (so-called PET bottles) composed mainly of polyethylene terephthalate, metal cans, paper containers lined with a metal foil or plastic film and bottles can be used. Here, the beverage means a beverage not requiring dilution.

The beverage of the present invention is prepared, for example, by filling a container such as metal can with the beverage, and then if possible, subjecting it to flash heating under conditions as specified by Food Sanitation Law. When the container is not suited for retort sterilization, for example, PET bottle or paper container, employed is a method of sterilizing the beverage under similar conditions to the above-described ones, for example, at high temperature for short time by a plate type heat exchanger, cooling it to a predetermined temperature and then, filling it in the container. Under sterile conditions, another ingredient may be filled in a container having the beverage already filled therein. It is also possible to sterilize by heating under acidic conditions and then return the pH to neutral under sterile conditions; or to conduct flash heating under neutral conditions and then returning the pH to acidic under sterile conditions.

By incorporating a high concentration of catechins, increasing the content of non-epi-catechins and adding further a water-soluble polymer, the beverage of the present invention having reduced bitterness and astringency can be provided.

EXAMPLES

Measurement of the Amount of Catechins in a Beverage

By using a high-performance liquid chromatograph ("Model SCL-10AVP") manufactured by Shimadzu Corporation and equipped with a packed column for an octadecyl-introducing liquid chromatograph, "L-Column TM ODS (4.6 mmo×250 mm: manufactured by Chemicals Evaluation and Research Institute), a beverage was subjected to a gradient method at the column temperature of 35° C. As mobile phase liquid A and liquid B, a distilled water solution containing 0.1 mol/L of acetic acid and an acetonitrile solution containing 0.1 mol/L of acetic acid were used, respectively. Measurement was conducted under the conditions of a sample injection amount of 20 μL and an UVdetector wavelength of 280 nm.

Measurement of Turbidity of the Beverage

By using a haze & transmittance meter ("Model HR-100") manufactured by Murakami Color Research Laboratory Co., Ltd., haze (H) was measured at 25° C. one minute after the beverage was charged in a glass cell (optical path length: 10 mm, width: 35 mm, length: 40 mm).

Components Used in Examples (1) Catechin Preparation

Commercially available catechin preparation A having a catechins content of 77% by weight, of which non-epi-catechins content is 6.9% by weight (product of Itoen).

Commercially available catechin preparation B having a catechins content of 86% by weight, of which non-epi-catechins content is 13.60% by weight (product of Tokyo Food Techno).

Commercially available catechin preparation C having a catechins content of 34% by weight, of which non-epi-catechins content is 9.5% by weight (product of Tokyo Food Techno)

(2) Tea Extract

Oolong Tea Extract

Ion exchanged water was added to oolong tea leaves, followed by extraction at a water/leaves ratio by weight of 25 at 90° C. for 5 minutes. The extract was filtered through a No. 2 two-ply paper filter and the filtrate was lyophilized. Catechins content: total catechin 21.3% by weight of which non-epi-catechins contetnt is 2.1% by weight.

Green Tea Extract

Ion exchanged water was added to green tea leaves, followed by extraction at a water/leaves ratio by weight of 25 at 70° C. for 5 minutes. The extract was filtered through a No. 2 two-ply paper filter and the filtrate was lyophilized. Catechins content: total catechin 30.2% by weight of which non-epi-catechins content is 1.03% by weight.

(3) Water-soluble Polymer

Water-soluble Polymer A

Ion exchanged hot water was added to natural tea leaves, followed by extraction at a water/leaves ratio by weight of 25 at 90° C. for 5 minutes. The extract was filtered through a No. 2 two-ply paper filter and the filtrate was lyophilized to obtain a solid substance. 500 mL of a 20% aqueous solution No. 2 two-ply paper filter and the filtrate was lyophilized to obtain a solid substance. 500 ML of a 20% aqueous solution of the resulting solid substance was added dropwise to 2 L of 95% ethanol under stirring. After completion of the dropwise addition, stirring was continued for 30 minutes. The reaction mixture was allowed to stand and then the supernatant was removed. After addition of 1 L of 95% ethanol to the residue and stirring, the mixture was allowed to stand and then, the supernatant was removed. This procedure was repeated three times. Through a No. 2 two-ply filter paper, the residue was filtered and a solid remaining on the filter paper was collected. It was dried at 50° C., whereby a dry product was obtained. In accordance with the method as described in Journal of Japanese Society of Nutrition and Food Science, 46(3), 244(1993), 3 g of the dry product was treated with an enzyme and reprecipitated, the precipitate was filtered through a No. 2 filter paper and the solid content on the filter paper was designated as the amount of water-soluble polymer A.

Water-soluble Polymer B

After addition of ion-exchanged hot water to natural tea leaves and extraction of the resulting mixture at a water/leaves ratio by weight of 25 at 90° C. for 5 minutes, the extract was filtered through a No. 2 two-ply filter paper. The filtrate was lyophilized, whereby a solid substance was obtained. A 2.0 g portion of the solid substance was charged in a beaker and dissolved with 150 ml of a phosphate buffer. The phosphate buffer was obtained by dissolving 48 g of sodium dihydrogenphosphate, 20 g of ascorbic acid and 1 g of EDTA2Na in 1 L of water and then adjusting the pH of the resulting solution to 3.9 with sodium hydroxide. The resulting solution of the sample was centrifuged at 3000 rpm/min for 15 minutes at 4° C. After removal of the precipitate, the residue was transferred to a dropping funnel. Extraction was conducted three times with 450 mL of mixture was allowed to stand still for at least 24 hours. Under a nitrogen atmosphere, the resulting aqueous phase was distilled to completely remove the solvent. The aqueous phase was dialyzed through a membrane ("Dialysis Membrane 27", product of Wako Pure Chemical Industries) for 6 days. Lyophilization was conducted after completion of the dialysis, whereby water-soluble polymer B was obtained.

Example 1

To 800 g of ion-exchanged water, the dried tea extract and commercially-available catechin preparation B were added in predetermined amounts as shown in Table 1, followed by the addition of the water-soluble polymer, and polytextrose in an amount as shown in Table 1. They were dissolved uniformly. After addition of 0.3 g of sodium ascorbate, an adequate amount of a 5% aqueous sodium bicarbonate solution was added to adjust the mixture to pH 6.2. Ion-exchanged hot water was further added to give the total amount of 1000 g.

Examples 2 to 9 and Comparative Examples 1 to 4

Following the procedures as described in Example 1 except by using the individual components as shown in Table 1 in the amounts as shown in Table 1, further beverages were obtained.

TABLE 1

| | Examples | | | | | | | | | Comparative Examples | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Colon tea extract | 1 | 1 | | 1 | 1 | 1 | 1 | | | 1 | | | |
| Green tea extract | | | 1 | | | | | | 1 | | 1 | 1 | |
| Catechin preparation A | | | 1.17 | | | | | | | | | | |
| Catechin preparation B | 1.2 | 1.2 | | 1.2 | 1.2 | 1.2 | 1.2 | | 1.3 | 1.2 | 1.2 | 1.32 | |
| Catechin preparation C | | | | | | | | 1.9 | | | | | 6.1 |
| Pol dextrose | 0.3 | 1 | 2 | | 2 | 3 | 5 | | | | 0.4 | | |
| Carboxymethyl cellulose(g) | | | | 2 | | | | | | | | | |
| Water soluble polymer A | | | | | | | | | 0.1 | | | 0.6 | 0.38 |
| Water soluble polymer B (g) | | | | | | | | | | 0.6 | | | |
| Na ascorbate | 0.3 | 0.3 | 0.3 | 0.3 | 0.3 | 0.3 | 0.3 | 0.3 | 0.3 | 0.3 | 0.3 | 0.3 | 0.3 |
| Sodium bicarbonate | q.s. | q.s. | q.s. | q.s. | q.s. | q.s. | q.s. | q.s. | q.s. | q.s. | q.s. | q.s. | q.s. |
| Ion exchanged water | Balance | Balance | Balance | Balance | Balance | Balance | Balance | Balance | Balance | Balance | Balance | Balance | Balance |
| Total weight | 1000 | 1000 | 1000 | 1000 | 1000 | 1000 | 1000 | 1000 | 1000 | 1000 | 1000 | 1000 | 1000 |
| Post treatment | Sterlization | Sterlization | Sterlization | Sterlization | Sterlization | Sterlization | Sterlization | Sterlization | Sterlization | | | | |
| *pH | 6 | 6 | 6 | 6 | 6 | 6 | 6 | 6 | 6 | 6.2 | 6.2 | 6.2 | 6.2 |
| A: non-epi-catechins (mg/500 mL) | 308 | 352 | 282 | 304 | 329 | 303 | 308 | 196 | 367 | 80 | 83 | 95 | 212 |
| B: epi-catechins (mg/500 mL | 254 | 291 | 226 | 247 | 255 | 232 | 247 | 122 | 228 | 545 | 549 | 593 | 900 |
| A + B: (mg/500 mL) | 562 | 643 | 508 | 551 | 564 | 535 | 555 | 318 | 595 | 625 | 632 | 688 | 1112 |
| NB | 1.21 | 1.21 | 1.25 | 1.23 | 1.29 | 1.31 | 1.25 | 1.61 | 1.61 | 0.15 | 0.15 | 0.16 | 0.24 |
| C/A + B | 0.27 | 0.78 | 1.97 | 0.27 | 1.71 | 2.80 | 4.50 | 0.08 | 0.50 | 0 | 0.31 | 0.44 | 0.17 |
| Turbidi | 3.7 | 4.1 | 3.8 | 4.5 | 5.8 | 6.2 | 6.4 | 2.8 | 14.4 | 3.8 | 4 | 28.3 | 3.3 |
| Bitterness; initial stage of Drinkin | 1.5+ | 1.5+ | 1.5+ | 1.5+ | 1+ | 1+ | 1+ | 1+ | 2+ | 3+ | 2+ | 2+ | 4+ |

TABLE 1-continued

|  | Examples | | | | | | | | | Comparative Examples | | | |
| --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 |
| Bitterness; medium stage of Drinkin | 2+ | 1.5+ | 1.5+ | 1.5+ | 1.5+ | 1+ | 1+ | 1+ | 2+ | 3+ | 3+ | 3+ | 5+ |
| Bitterness; latter stage of Drinkin | 2+ | 2+ | 2+ | 1.5+ | 2+ | 2+ | 1+ | 1+ | 2+ | 3+ | 3+ | 3+ | 5+ |

*Sterilizing conditions: at 120° C. for 10 minutes

The taste of the beverages was evaluated by a panel of 4 experts in accordance with the following method.

Since bitterness and astringency of the beverage came from a plurality of components or components of different dissolution states, evaluation was made in three stages, that is, immediately after putting it in mouth (initial stage of drinking), having it in their mouth for several seconds (middle stage of drinking) and immediately after swallowing (latter stage of drinking).

Evaluation was made based on the following criteria:
[6+]: pungent with severe bitterness and astringency
[5+]: having severe bitterness and astringency
[4+]: having strong bitterness and astringency
[3+]: having bitterness and astringency
[2+]: having a little strong bitterness and astringency
[1+]: having slight bitterness and astringency Beverages of Comparative Examples 1 to 4 were not suited for customary drinking because their bitterness level was 3+ or greater, while those of Examples 1 to 9 were suited for customary drinking because they had weak bitterness and astringency and smooth throat-feel upon drinking.

INDUSTRIAL APPLICABILITY

The beverages of the present invention contain a high concentration of catechins, and at the same time, have improved taste with alleviated bitterness and astringency and have smooth throat-feel upon drinking.

The invention claimed is:

1. A beverage, which comprises in the dissolved form the following non-polymer component (A), another non-polymer component (B), and component (C):
   (A) non-epi-catechins,
   (B) epi-catechins,
   (C) water-soluble polymers; and has, per 500 mL of the beverage, said components in amounts satisfying the following equations:

$(A)+(B)=300$ to 2500 mg  (i)

$(A)=70$ to 2250 mg  (ii)

$(A)/(B)$(by weight)=0.25 to 9.0, and  (iii)

$(C)/((A)+(B))$(by weight)=1/20 to 10/1  (iv)

2. A beverage according to claim 1, having a pH 3 to 7.
3. A beverage according to claim 1 or 2, wherein said catechins have been obtained by adding a tea extract concentrate to a tea liquid extract.
4. A beverage according to any one of claims 1 or 2, wherein the tea liquid extract is a liquid extract of tea selected from semi-fermented teas and fermented teas.
5. A packaged beverage obtained by filling a container with a beverage as claimed in any one of claims 1 or 2.
6. A method of preparing beverages comprising incorporating a water-soluble polymer (C) together with non-epi catechins (A) and epi-catechins (B) in amounts that satisfy the following equations:

$(A)+(B)=300$ to 2500 mg  (i)

$(A)=70$ to 2250 mg  (ii)

$(A)/(B)$(by weight)=0.25 to 9.0, and  (iii)

$(C)/((A)+(B))$(by weight)=1/20 to 10/1,based on 500 mL of said beverage.  (iv)

7. The beverage of claim 1, wherein (A)+(B)=400 to 1300 mg.
8. The beverage of claim 1, wherein (A)+(B)=500 to 1300 mg.
9. The beverage of claim 1, wherein (A)+(B)=500 to 800 mg.
10. The beverage of claim 1, wherein the catechins content in the total polyphenols is 10 wt. % or greater.
11. The beverage of claim 1, wherein the sum of epigallocatechin gallate, gallocatechin gallate, epigallo catechin is 30 to 98 wt. % of the total catechins.
12. The beverage of claim 1, wherein component (A) is 140 to 2250 mg.
13. The beverage of claim 1, wherein component (A) is 140 to 1880 mg.
14. The beverage of claim 1, wherein the component (A)/component (B) ratio is 0.43 to 9.0.
15. The beverage of claim 1, wherein the component (A)/component (B) ratio is 0.43 to 5.67.
16. The beverage of claim 1, wherein the component (A)/component (B) ratio is 0.54 to 5.67.
17. The beverage of claim 1, wherein said water-soluble polymer is at least one selected from the group consisting of gum arabic, alginic acid, carrageenan, agar, xanthan gum, gelatin, tamarind seed polysaccharide, furcellaran, locust bean gum, branched dextrin, polydextrose and caboxymethyl cellulose.
18. The beverage of claim 1, wherein a pH is from 4 to 7.
19. The beverage of claim 1, wherein a pH is from 5 to 7.
20. The beverage of claim 1, wherein said beverage has a haze value of 40 or less.

* * * * *